Sept. 25, 1923.　　　　F. C. HALL　　　　1,469,082
HEADREST
Filed Sept. 13, 1922
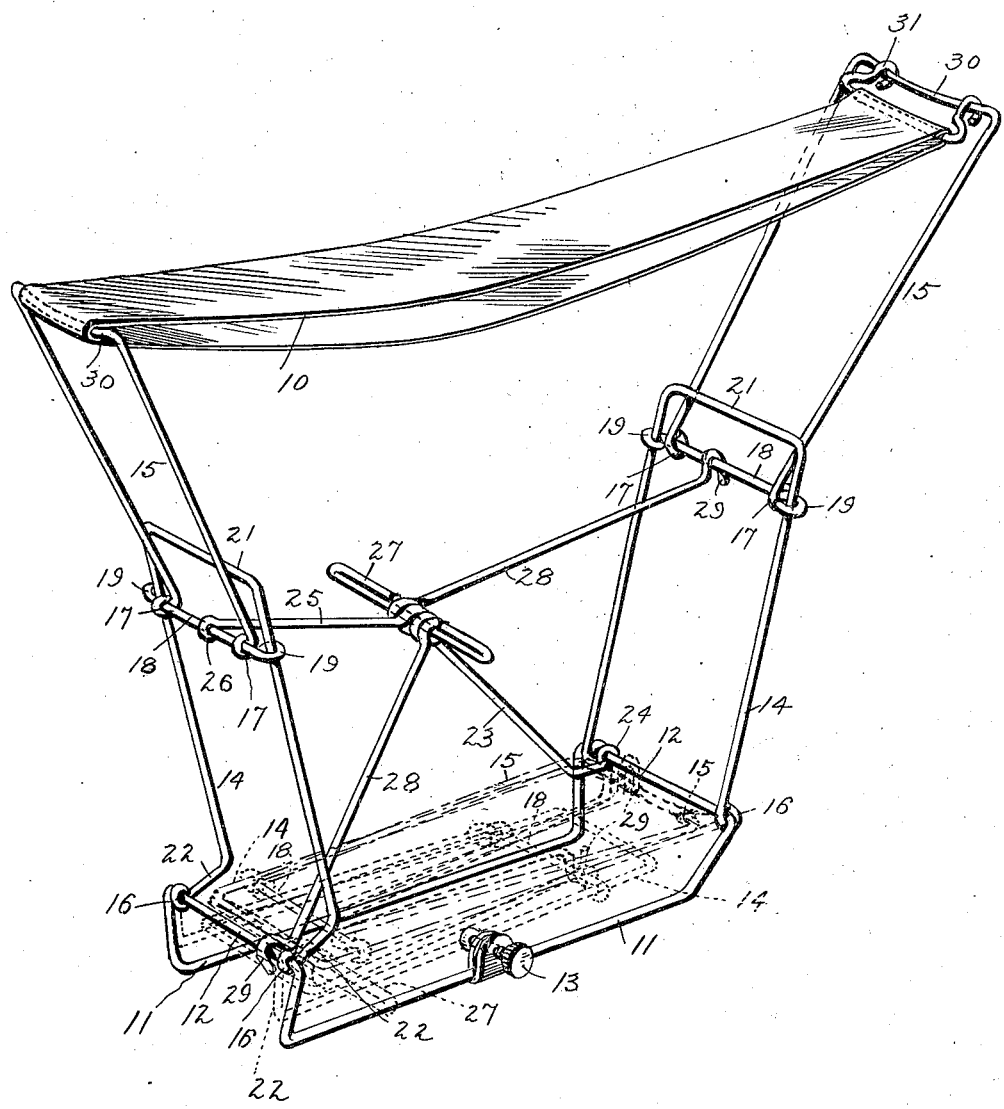

Patented Sept. 25, 1923.

1,469,082

UNITED STATES PATENT OFFICE.

FRANCIS CADWALADER HALL, OF WASHINGTON, DISTRICT OF COLUMBIA.

HEADREST.

Application filed September 13, 1922. Serial No. 587,948.

*To all whom it may concern:*

Be it known that I, FRANCIS C. HALL, residing at Washington, in the District of Columbia, a citizen of the United States, have invented certain new and useful Improvements in Headrests, of which the following is a specification.

The object of my invention is to provide a head rest which while applicable to other uses is specially suitable for use by passengers in the usual day coach so that the passenger may occupy a reclining position, and thus travel more comfortably than sitting upright, and to provide a rest for that purpose which may be readily attached to and detached from the car seat and which when not in use may be folded into a very compact form so that it may easily be carried by the passenger. My invention consists in whatever is described by or included within the meaning or scope of the appended claims.

In the annexed drawings I illustrate my invention in an embodiment for use by passengers on a day coach, in which drawings:

The figure is a perspective view of such embodiment arranged for use;

Briefly described my invention comprehends the use of a sling that may be suspended at its ends so as to extend in a direction from front to the back of the seat so that a person occupying the seat and lying or sitting lengthwise thereof may rest his head in or upon such sling which is made of webbing of sufficient width to give a comfortable support to the head or neck.

The sling 10, which may be made of webbing when the device is in use is attached at its ends and is thereby suspended from the upstanding arms of a framework preferably made of wire which includes a base formed of spaced parallel horizontal rails, 11, which at the ends are bent upward and outward and are connected by cross members, 12, the form of the base thus being such that it may be sprung downward over the top of a car seat with the cross members, 12, resting on the top thereof and the sides gripped by the side rails, 11, and thus a secure attachment of the base to the car seat is afforded, but one which permits of easy removal and application. If desired as a matter of precaution the side rails or one of them at substantially midlength may be provided with a clamp in the form of a screw, 13, which may be screwed against the side of the car seat arm, the arm engaging end of the screw being covered with some soft material to prevent denting or marring otherwise by the clamp.

The sling suspending arms are alike each consisting of two substantially similar U-shaped members, 14, and 15, respectively, one of which is pivoted by eyes, 16, at the end of its legs to a base cross member, 12, and the other, 15, being similarly pivoted by eyes, 17, to a cross-bar, 18, that is attached by eyes, 19, at its ends just below the upper end of the member, 14, so that the two members, 14, and, 15, are articulated or hinged together and hinged to the base so that they may be folded one against the other and the two folded down parallel with the base and thus when not in use the frame work may be collapsed to a very compact state. The legs of the member, 15, when the latter is in the opened out position shown in full lines of the drawing, pass on the outer side of the top cross-bar, 21, of the member, 14, so that the latter forms a stop which holds the member, 15, in a position extending upward and outward notwithstanding the inward pull or strain from the weight of the head of the user upon the sling, 10, and as the members, 14, when in use extend upward and outward it will be seen that the points of suspension of the sling, 10, are considerably further apart than the length of the base and hence a sling of ample length is afforded and the upward and outward inclination of the sling supporting arms tends to resist any collapsing tendency of the arms towards one another from weight upon the sling.

One of the arms, 14, has jogged or offset portions, 22, from its leg eye, 16, so that when the framework is folded said arm, 14, will lie close to the plane of the side rails, 11, and thus provide room for the compact folding over against the same of the other arm members, 14, and, 15.

Each sling suspending arm is supported and braced in its open position by a truss-like bar that extends obliquely or diagonally between the opposite cross member, 12, and the arm cross bar, 18. Said truss in one case consists of a bar, 23, pivoted by an eye, 24, to a base cross member, 12, and a bar, 25, which is pivoted by an eye, 26, to the cross-bar 18, of the opposite arm and the two bars, 23, and, 25, are pivoted together by eyes on their respective ends through which passes a pivot forming rod, 27. The other truss comprises two similar bars, 28, each of which at one end has an eye which pivotally connects it with the rod or bar, 27, and at its outer end each bar, 28, has a hook, 29, which in one case is adapted to catch over the other base cross member, 12, and in the other case is adapted to hook over the arm member cross-bar, 18, that is diagonally opposite the cross member, 12, with which the hook, 29, of the other bar, 28, engages. When the hooks, 29, are engaged with the respective cross member, 12, and 18, the sling supporting arms are securely and rigidly embraced in sling supporting position and when said hooks are disengaged they and the truss bars, 23, and, 25, and the members of the sling supporting arm may be folded over upon the base, all of said parts lying substantially horizontally in the space between the base cross members, 12, as shown in dotted lines in the drawing. Preferably the ends of the pivot forming rod, 27, project far enough to rest upon the side rails, 11, of the base when the framework is in a folded or collapsed state and thereby any dropping of the truss members through the space between said side rails, 11, is prevented. The ends of the rod, 27, may as shown be folded or doubled over to provide a rounded finish that will preclude scratching of objects by the extremities of the rod, 27, and the bent over portions may have such length that their ends form stops to confine the eyes of the truss member against sidewise movement.

The sling, 10, is preferably made of two folds of webbing that lie one over the other but are free of one another so that one portion may be slipped sidewise over the other and thus a wider bearing for the head or neck is afforded than would be the case with a single width of webbing. At one end the doubled over webbing passes around the top cross-bar, 30, of one upper arm member, 15, and at the other end the webbing is attached to a double hook, 31, adapted to catch over the top cross-bar, 30, of the other upper arm member, 15, so that the sling may be readily attached to and detached from such arm member. To prevent the sling sliding sidewise off the top bar, 30, of the arms, such bars are curved downward as shown. When the framework is in its collapsed or folded state the sling, 10, is wrapped lengthwise around the same, it being long enough completely to substantially once enclose the collapsed framework and the double hooks, 31, are caught over one of the cross-bars of the framework to confine the framework in its collapsed state and hold the sling thus folded.

It will be seen that by suitable variation of the form of the base my head rest can be rested upon the ground or upon a cot to take the place of a pillow and hence it is admirably suited for campers' use.

What I claim is:

1. A head rest comprising a head receiving member and a foldable framework comprising a base and arms pivoted to the base, each arm being of members that are pivoted together, the head-receiving member being attached to and extending between the arms at the upper ends thereof and being separable from at least one of such arms, the pivotal connection between the members of each arm permitting folding movement of one arm member upon the other when the head-receiving member is detached from at least one of the arms.

2. A head rest comprising a head receiving member and a foldable framework comprising a base and arms pivoted to the base, each arm being of members that are pivoted together one of such members forming a stop to limit the swinging movement of the other member in one direction under load on the head-receiving member, and a pair of foldable truss members comprising each rods jointed together and at least two of said rods being attachable to and detachable from one of the arms and the base.

3. A head rest comprising a head receiving member and a foldable framework comprising a base and arms pivoted to the base, each arm being of members that are pivoted together, and a pair of foldable truss members comprising each rods jointed together and at least two of said rods being attachable to and detachable from one of the arms and the base, and the rods of the other truss member being pivotally connected with the other arm and the base respectively.

4. A head rest comprising a head receiving member and a foldable framework comprising a base and arms pivoted to the base, each arm being of members that are pivoted together, one of such members forming a stop to limit the swinging movement of the other member in one direction under load on the head-receiving member, said base comprising a pair of inwardly converging sides adapted to be sprung over a car seat arm.

5. A head rest comprising a head receiving member, a base, arms that extend upwardly in diverging directions, pivotally connected with the base at the ends thereof, respectively, each of said arms being of members that are hinged together so that one member may fold upon the other and both arms in a folded condition being foldable upon the base to lie parallel therewith, and means to brace the arms when in their opened out position.

6. A head rest comprising a head receiving member, a base, arms that extend upwardly in diverging directions, pivotally connected with the base at the ends thereof, respectively, each of said arms being of members that are hinged together so that one member may fold upon the other and both arms in a folded condition being foldable upon the base to lie parallel therewith and means to brace the arms when in their opened out position, one of each arm members having a stop to limit the movement of the other arm member under load on the head receiving member.

In testimony whereof I hereunto affix my signature.

FRANCIS CADWALADER HALL.